(12) United States Patent
Kulkarni et al.

(10) Patent No.: US 11,079,830 B2
(45) Date of Patent: Aug. 3, 2021

(54) APPARATUS AND METHOD FOR REDUCING DI/DT

(71) Applicant: Intel Corporation

(72) Inventors: Jaydeep P. Kulkarni, Portland, OR (US); Yong Shim, West Lafayette, IN (US); Pascal A. Meinerzhagen, Lausanne (CH)

(73) Assignee: Intel Corporation, Santa Clara, CA (US)

( * ) Notice: Subject to any disclaimer, the term of this patent is extended or adjusted under 35 U.S.C. 154(b) by 965 days.

(21) Appl. No.: 15/163,494

(22) Filed: May 24, 2016

(65) Prior Publication Data

US 2017/0344090 A1     Nov. 30, 2017

(51) Int. Cl.
*H02M 3/07* (2006.01)
*G06F 1/324* (2019.01)
*G06F 1/3296* (2019.01)
*G06F 1/3287* (2019.01)

(52) U.S. Cl.
CPC ............ *G06F 1/324* (2013.01); *G06F 1/3287* (2013.01); *G06F 1/3296* (2013.01); *H02M 3/07* (2013.01); *Y02D 10/00* (2018.01)

(58) Field of Classification Search
CPC ...................................................... G06F 1/324
See application file for complete search history.

(56) References Cited

U.S. PATENT DOCUMENTS

| 2002/0101748 | A1 | 8/2002 | Loechner |
| 2006/0017423 | A1 | 1/2006 | Frith et al. |
| 2006/0226869 | A1* | 10/2006 | Chong ............... H03K 19/0016 326/33 |
| 2008/0066035 | A1 | 3/2008 | Asao |
| 2009/0179691 | A1* | 7/2009 | Tanzawa ............... H02M 3/073 327/536 |
| 2010/0264991 | A1 | 10/2010 | Young et al. |
| 2011/0074472 | A1 | 3/2011 | Kawasaki |
| 2014/0035661 | A1* | 2/2014 | Myers ..................... H02M 3/07 327/536 |

FOREIGN PATENT DOCUMENTS

| CN | 1728498 | 2/2006 |
| JP | 2003164142 | 6/2003 |
| JP | 2005287101 | 10/2005 |
| JP | 2013192438 | 9/2013 |

OTHER PUBLICATIONS

International Preliminary Report on Patentability from PCT/US2017/028637 dated Dec. 6, 2018, 9 pgs.
International Search Report & Written Opinion dated Jul. 27, 2017 for PCT Patent Application No. PCT/US17/28637.
Office Action from Chinese Patent Application No. 201780026619.1 dated Jun. 4, 2020, 19 pgs.
Office Action from Chinese Patent Application No. 201780026619.1 notified Jan. 25, 2021, 9 pgs.

* cited by examiner

*Primary Examiner* — Kim Huynh
*Assistant Examiner* — Eric Chang
(74) *Attorney, Agent, or Firm* — Green, Howard & Mughal LLP

(57) ABSTRACT

Described is an apparatus which comprises: a controllable power gate coupled to an ungated power supply node and a gated power supply node; and a charge-pump circuit operable to be turned on and off according to a logic, wherein the charge pump circuit is coupled in parallel to the controllable power gate and also coupled to the ungated power supply node and the gated power supply node.

26 Claims, 12 Drawing Sheets

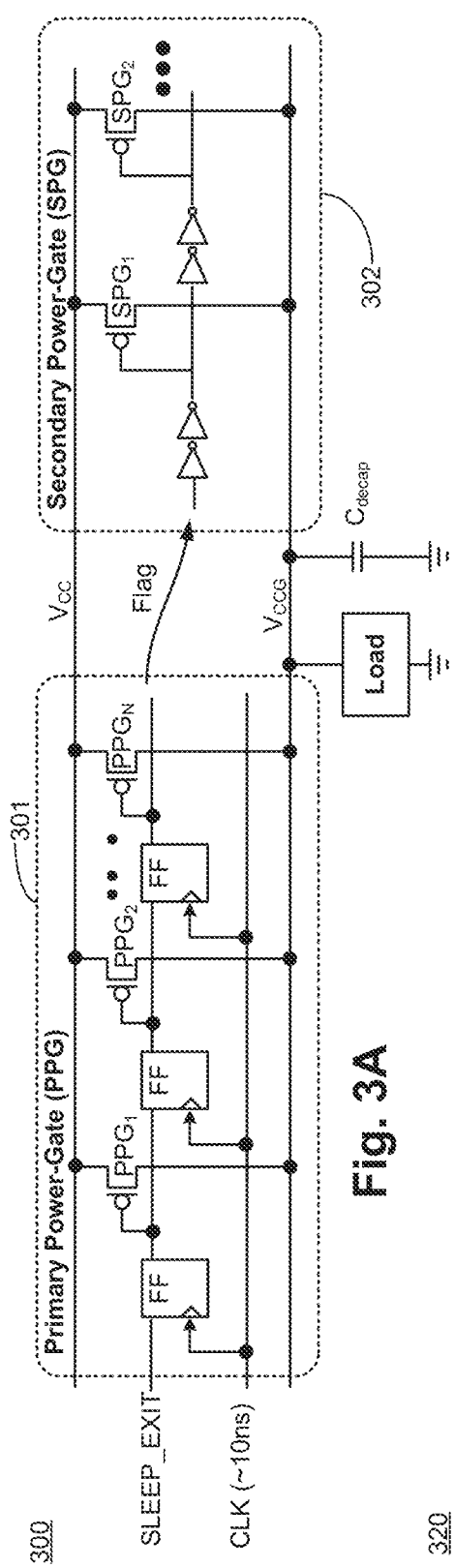
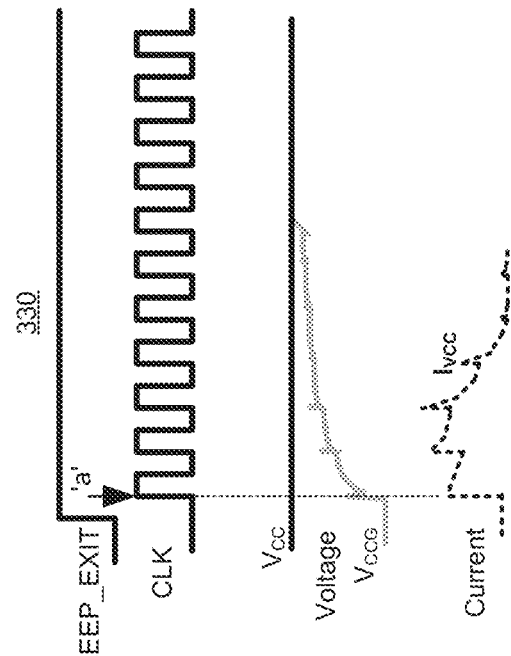
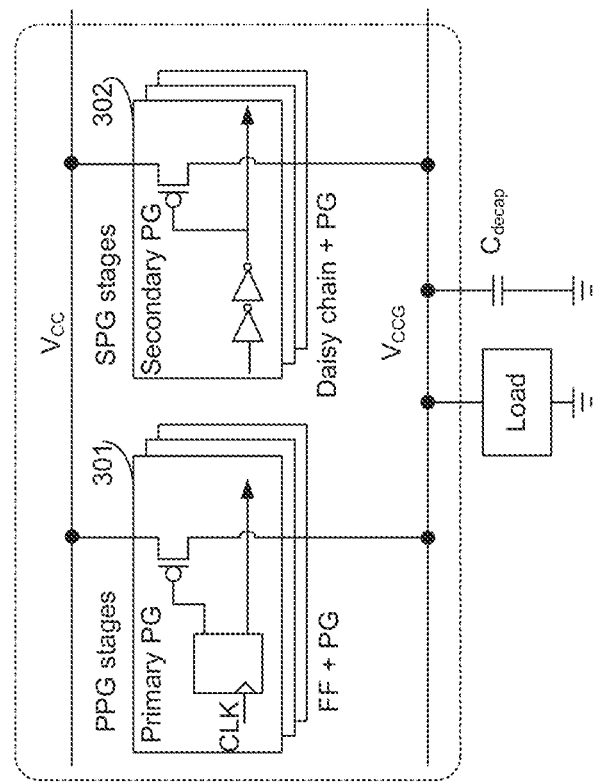

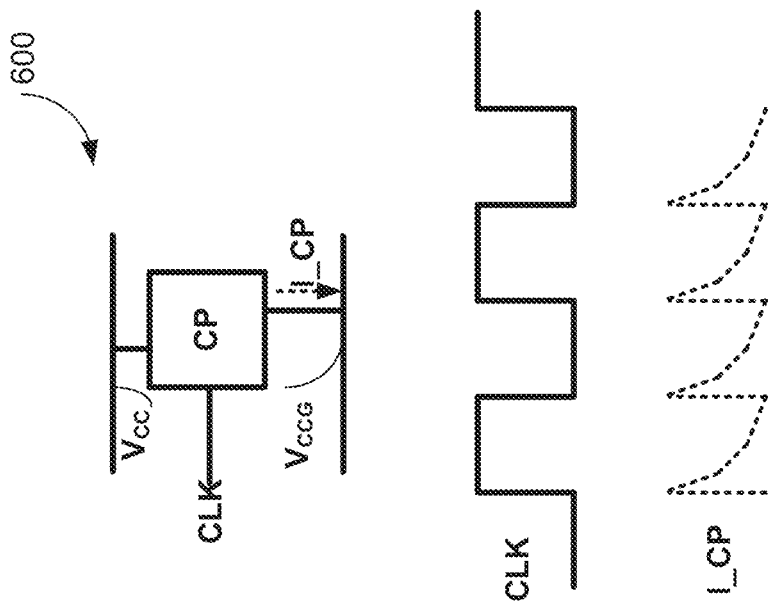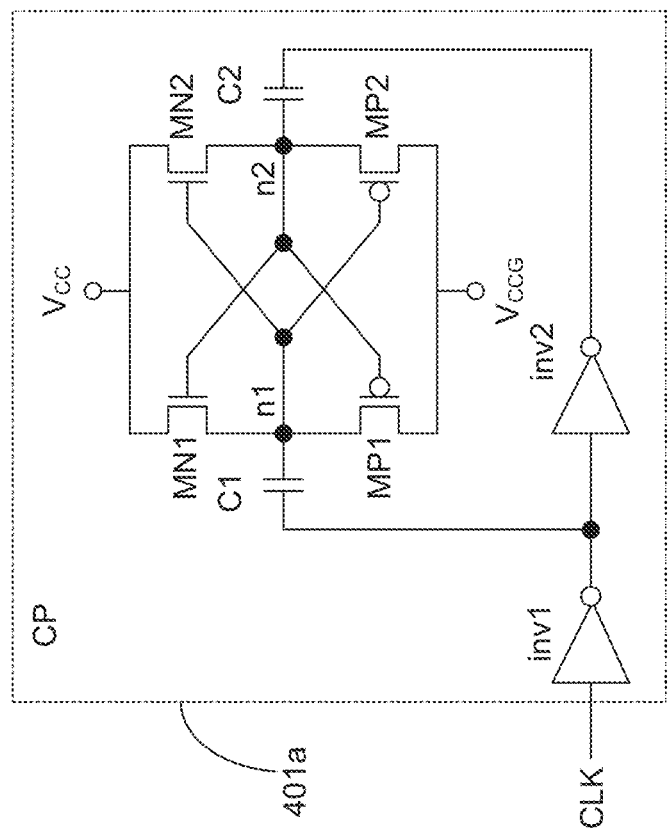
Fig. 6

APPARATUS AND METHOD FOR REDUCING DI/DT

BACKGROUND

As efficient power management for handheld devices (e.g., smart phones) becomes crucial, entering and/or exiting power-down mode(s) become quite frequent. While exiting a low power mode (e.g., sleep mode), sudden surge of current may occur on the power supply node. This sudden charge depends on the Process, Voltage, and Temperature (PVT) conditions and/or remaining charge inside the load unit coupled to the power supply node. This abrupt current change causes di/dt peak and may lead to functional failure in circuits coupled to the power supply node.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 3A illustrates a baseline wake-up network with a two-stage configuration.

FIG. 3B illustrates a compact view of the baseline wake-up network with the two-stage configuration.

FIG. 3C illustrates a set of waveforms showing the operation of the baseline wake-up network of FIG. 3A.

FIG. 6 illustrates a charge-pump circuit for use in the charge-pump assisted wake-up network, according to some embodiments of the disclosure.

DETAILED DESCRIPTION

Figure 1:
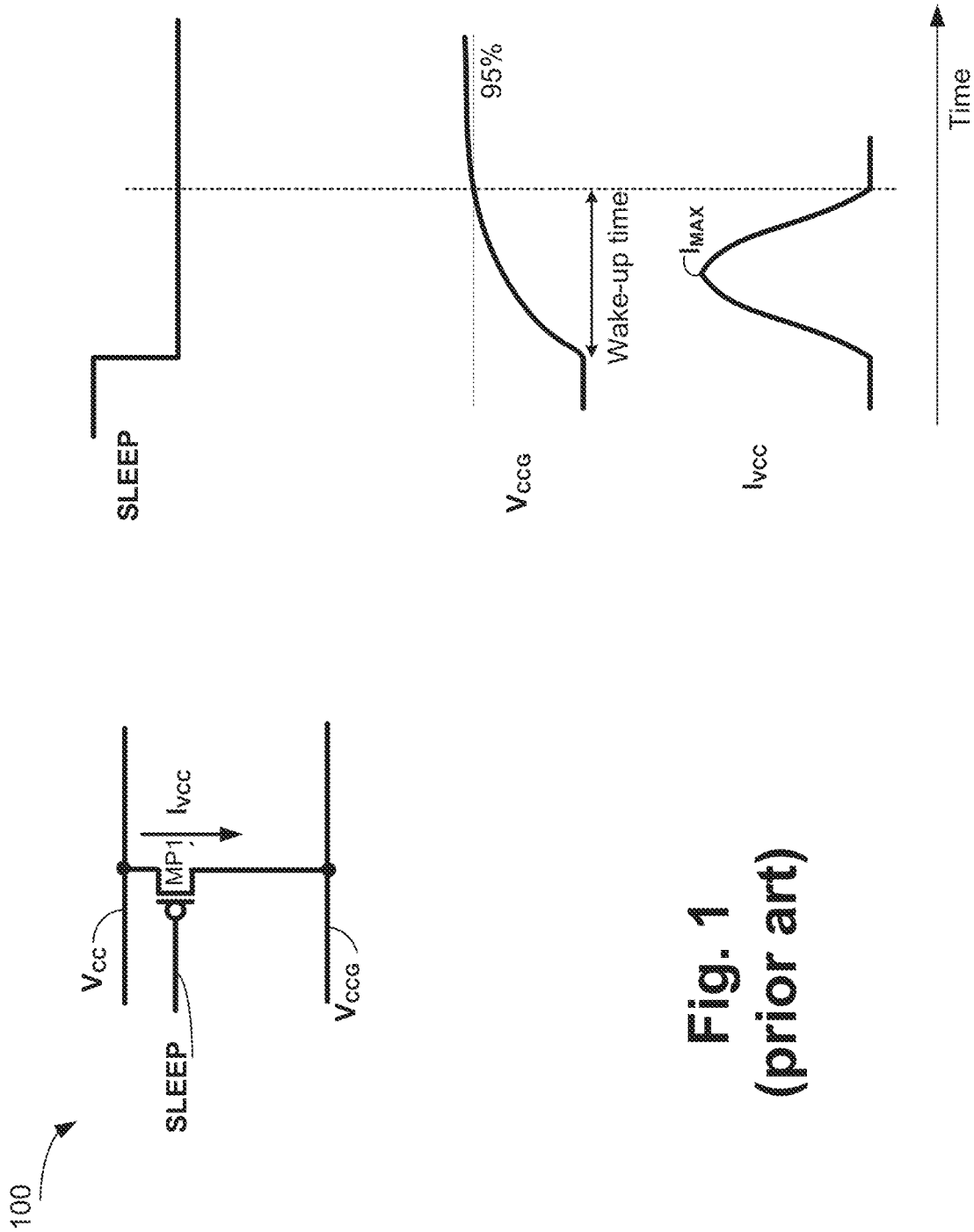
FIG. 1 illustrates a simple wake-up network with a single Power Gate (PG) to connect/disconnect a gated rail $V_{CCG}$ from a power source $V_{CC}$.

The wake-up network (or a power gate) is commonly used to minimize leakage current of an idle logic during the sleep mode. FIG. 1 illustrates a simple wake-up network 100 with a single Power Gate (PG) to connect/disconnect a gated rail $V_{CCG}$ (also referred to as the gated supply node) from a power source $V_{CC}$ (also referred to as the ungated supply node) via a SLEEP signal. Here, the PG is a p-type transistor MP1. However, power gates can be a combination of n-type and p-type devices. If there is just a single huge PG transistor, when the SLEEP signal is asserted (indicating exit of the sleep state), huge current surge will happen and the potential level of the gated rail $V_{CCG}$ will rapidly rise up to the $V_{CC}$ level. As such, simple wake-up network 100 will cause a high di/dt peak as shown in $I_{vcc}$ plot.

The high di/dt peak of the current curve is $I_{MAX}$. The high di/dt can damage circuits coupled to the gated rail $V_{CCG}$. To prevent high $I_{MAX}$, one of the effective ways is to divide the single huge PG transistor MP1 into the multiple smaller PG transistors and control each PG transistor using multiple signals which are temporarily apart. By sequentially turning on each PG transistor, the $I_{MAX}$ problem can be mitigated at the expense of increased wake-up time. For example, as the waveform of $I_{VCC}$ is made flatter (i.e., smaller di/dt), Wake-up time increases. Here, Wake-up time is defined as the time it take for $V_{CCG}$ supply to ramp up to a predetermined percentage (e.g., 95%) of its expected level (e.g., $V_{CC}$ level).

Figure 2:
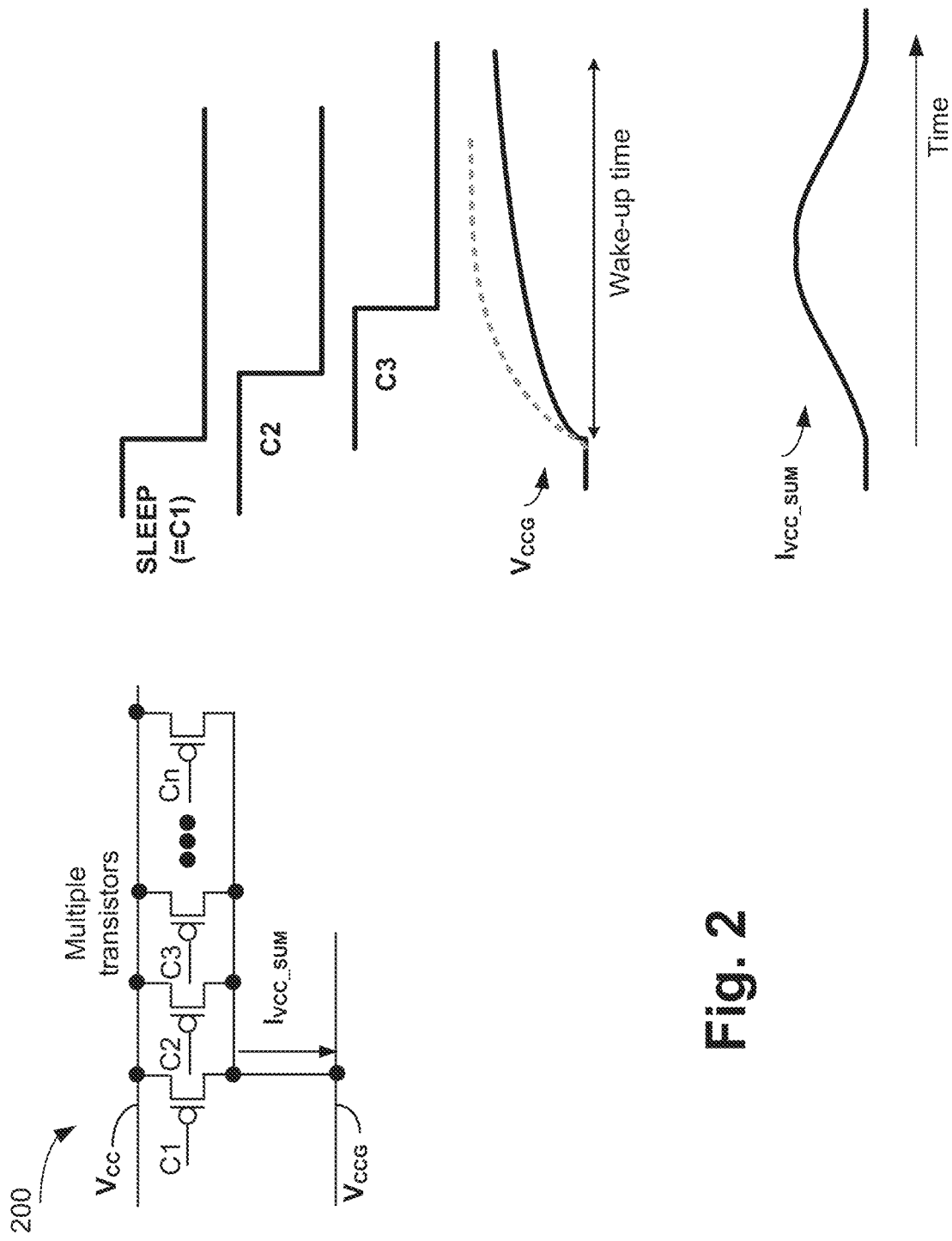
FIG. 2 illustrates a wake-up network in which a single huge PG transistor MP1 of the wake-up network of FIG. 1 is divided into multiple smaller PG transistors each controlled by a respective control signal.

FIG. 2 illustrates wake-up network 200 in which the single huge PG transistor MP1 of wake-up network 100 is divided into multiple smaller PG transistors each controlled by a respective control signal (e.g., control signals C1, C2, C3, . . . Cn, where 'n' is an integer). Here, the controls signals C1, C2, C3, . . . Cn are temporarily apart. For example, the falling edge of controls signal C1 is before in time the falling edge of control signal C2, and the falling edge of control signal C2 is before in time the falling edge of control signal C3. In this case, plot $I_{VCC\_SUM}$ shows less di/dt at the expense of higher Wake-up time. (Note, the dotted curve of the $V_{CCG}$ plot is the $V_{CCG}$ ramping of wake-up network 100.).

Another scheme to keep the di/dt level low enough to avoid functional failure of the circuits coupled to the power supply node is to use a two-stage wake-up network. In one such scheme, a series of flip-flops (FFs) are turned on based on a clock rising edge and then a daisy chain is used to turn on the rest of the power gate transistors.

FIG. 3A shows a baseline wake-up network 300 with a two-stage configuration—first stage 301 and second stage 302. First stage 301 is FF (flip-flop) based wake-up configuration and second stage 302 is a daisy chain configuration. First stage 301 operates based on an external clock signal (CLK e.g., 10 ns). First stage 301 consists of primary power gates (PPG) $PPG_{1-N}$ with their gate terminals connected to the outputs of the respective FFs, where 'N' is a number. The $PPG_{1-N}$ are coupled to an ungated power supply node $V_{CC}$ and a gated power supply node $V_{CCG}$. A load and a decoupling capacitor $C_{decap}$ is coupled to the $V_{CCG}$ node. Throughout the disclosure, labels for nodes and corresponding signals on that node are interchangeably used. For example, $V_{CC}$ may refer to node $V_{CC}$ or power supply $V_{CC}$ depending on the context of the sentence.

A "SLEEP_EXIT" signal is received as data input to the first FF. The output of the first FF is provided as input to a subsequent FF, and so on. Here, "SLEEP_EXIT" refers to a signal that when logically low, indicates an exit from a low power state such as a sleep state. Conversely, when the SLEEP_EXIT signal is logically high, it indicates entering the low power state.

After the SLEEP_EXIT signal de-asserts (i.e., transitions from a logic high to a logic low in this example), each single Primary Power-Gate (PPG) element (i.e., $PPG_{1-N}$) are turned on in series synchronized with the rising edge of CLK. When all the PPG transistors in PPG stage 301 (also referred to as the first stage) are turned on, first stage 301 ends its operation and hands over a Flag signal to the Secondary Power-Gate (SPG) stage 302 (same as the second stage).

Here, SPG stage 302 is a simple daisy chain (e.g., approximately with 1200 stages) with a small sized power-gate transistor per stage. Each PG transistor in SPG stage 302 is turned on every two inverter gate delays to decrease the current peak on the $V_{CC}$ and $V_{CCG}$ nodes. One intention of using this kind of two-step wake-up network is to obtain a low di/dt peak within a reasonable wake-up time. However, this scheme results in significant di/dt which is not low enough to not create problems for circuits operating on $V_{CC}$. (Note: when $V_{CCG}$ is rising, no active operation is happening at this time. It is the di/dt on $V_{CC}$ node which affects the neighboring active work.).

FIG. 3B illustrates a compact view 320 of baseline wake-up network 300 with the two-stage configuration. It is pointed out that those elements of FIG. 3B having the same reference numbers (or names) as the elements of any other figure can operate or function in any manner similar to that described. Here, few stages of the PPG stages 301, and a large number (e.g., approximately 1200) of SPG stages 302 are shown. The number of SPG stages 302 can change based on the loading conditions. The PPG stages 301 may be connected in a serial fashion and the SPG stages 302 may be connected in a daisy chain fashion.

FIG. 3C illustrates a set of waveforms (set 330) showing the operation of the baseline wake-up network of FIG. 3A. It is pointed out that those elements of FIG. 3C having the same reference numbers (or names) as the elements of any other figure can operate or function in any manner similar to that described.

FIG. 3C shows the waveform of a baseline two-step wake-up method and the expected di/dt plot. When a first PG transistor $PPG_1$ is turned on at timing 'a', $V_{CCG}$ power rail will start charging up. Since $V_{CCG}$ initially has very low potential level, the transistor $PG_1$ can have a maximum $V_{DS}$ value. So $PPG_1$ provides a huge current to the $V_{CCG}$ rail (or node). This is why there is a sudden jump in current and voltage at timing 'a'.

After that, slow rising of the voltage is followed. When the next clock rising edge arrives, the same current and voltage jump occurs but with a reduced step as the $V_{DS}$ of the next transistor decreased. The current peaks at every clock rising edge causes large current variation during a short time period. Even though the total current required to fully charge the $V_{CCG}$ rail can be distributed over a wide time range by using this baseline two-step wake-up network, the current surge from the each PPG transistor turn-on event can cause an unexpected local di/dt problem.

The baseline design of FIG. 3A can decrease the peak di/dt value within a reasonable wake-up time. In some embodiments, wake-up time can be improved further by adding a Charge Pump (CP) to the baseline design of FIG. 3A. In some embodiments, the CP can provide an almost constant current to the load with a multi-phase operation irrespective of the load voltage ($V_{CCG}$ in this case). CP based constant current delivery to the load may not create additional di/dt and can improve the wake-up time, in accordance with some embodiments. In some embodiments, the CP can be more effective than PPG 301 towards the end of the wake-up time. One reason for the effectiveness is the fact that PPG 301 operates in the linear region and its charge transfer efficiency is diminished as $V_{CCG}$ rises close to $V_{CC}$. CP on the other hand has a constant charge transfer efficiency which can be more effective than upsizing PPG 301 in improving wake-up time without increasing di/dt peaks. The disclosure describes various embodiments of a wake-up network having a charge-pump as wake-up assist circuit for a Primary Power-Gate (PPG) to reduce a di/dt peak and to improve the wake-up time during a sleep-exit event.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "bottom," "over," "under," and the like in the description and in the claims, if any, are used for descriptive purposes and not necessarily for describing permanent relative positions.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 4:
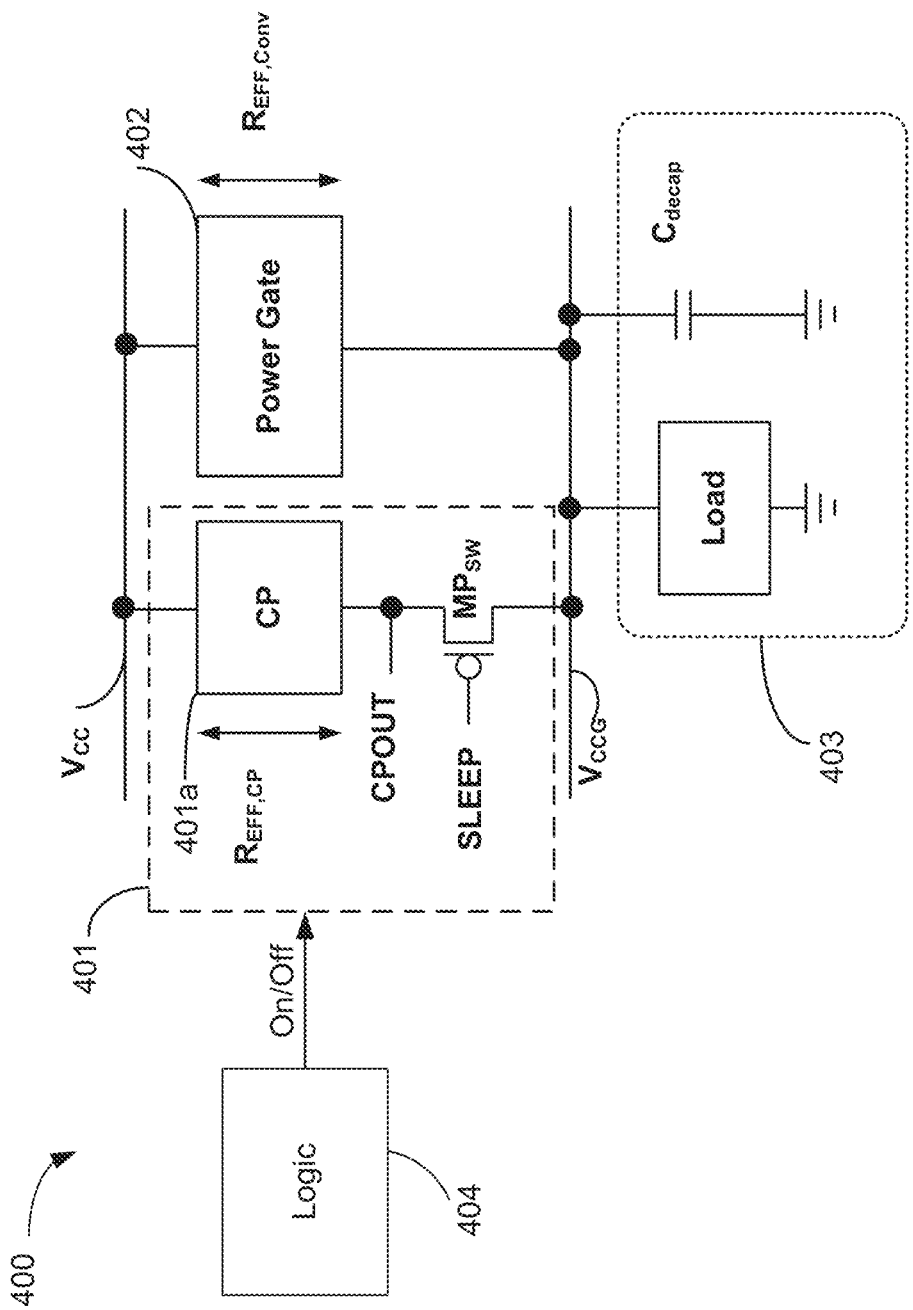
FIG. 4 illustrates a charge-pump assisted wake-up network, according to some embodiments of the disclosure.

FIG. 4 illustrates a charge-pump assisted wake-up network 400, according to some embodiments of the disclosure. It is pointed out that those elements of FIG. 4 having the same reference numbers (or names) as the elements of any other figure can operate or function in any manner similar to that described, but are not limited to such.

In some embodiments, charge-pump assisted wake-up network 400 comprises charge-pump (CP) 401 and Power Gate (PG) 402, where CP 401 and PG 402 are coupled to a load 403. In some embodiments, charge-pump assisted wake-up network 400 comprises Logic 404 which is operable to control CP 401. In some embodiments, CP 401 is coupled to an ungated power supply node $V_{CC}$ and a gated power supply node $V_{CCG}$. In some embodiments, PG 402 (also referred to as a controllable power gate) is also coupled to the ungated power supply node $V_{CC}$ and the gated power supply node $V_{CCG}$.

Here, a charge pump (e.g., CP 401) is any arrangement of devices that can generate sufficient voltage to transfer charge into a target node such as into a gated supply node. For example, a charge pump may generate a voltage above a target level (e.g., designed to be double a supply voltage level) to inject charge into a target gated supply node at a sufficient rate. The charge pump can be implemented in any suitable way such as with active devices (e.g., transistors) and passive devices (e.g., capacitors). The capacitors can be implemented using active transistors configured as capacitors, using metal capacitors, and/or a combination of both. The charge pump can be an arrangement of devices that can provide charge above a threshold level in response to a stimulus (e.g., an enable/disable signal). As such, the charge pump can be a controllable set of devices.

Here, power gate (e.g., PG 402) can be a controllable device which when enabled in any suitable manner can charge a node. For example, a power gate is a one or more devices (e.g., p-type devices) that can charge a node gradually or in step wise fashion. Power gate can gradually turn on (e.g., input to its gate terminal can be gradually ramped up/down) without suffering wake-up time (e.g., time when the node is charged above a target level). Power gate(s) can also be sequentially turned on. Power gate(s) in another example can be turned on in a delayed fashion. The power gate can be one large device or multiple large devices connected in parallel to one another. These multiple devices can be turned on gradually or step wise (e.g., binary 1 or 0 inputs). A person skilled in the art would appreciate that any suitable manner can be used to turn on the power gate to limit its impact on di/dt and wake-up time.

In some embodiments, CP 401 comprises CP circuit 401a (e.g., voltage doubler charge-pump, voltage tripler, and the like) coupled in series with a switch transistor (e.g., p-type transistor $MP_{SW}$) which is controllable by the SLEEP signal. In some embodiments, CP 401 is operable to turn on or off according to a control signal On/Off (or a pulse) generated by Logic 404. Here, the effective resistance of CP 401a is $R_{EFF,CP}$, while the effective resistance of PG 402 is $R_{EFF,CONV}$.

In some embodiments, when CP circuit 401a is a voltage-doubler, the output CPOUT of the CP 401 will have $2*V_{CC}$ level (i.e., twice the $V_{CC}$ level) in maximum. However, this may not mean that load 403 directly sees the twice of the nominal $V_{CC}$ because the effective resistance $R_{EFF,CP}$ of the CP circuit 401a and transistor $MP_{SW}$ is much larger than the effective resistance $R_{EFF,Conv}$ of PG 402. As such, the final voltage level of the gated rail $V_{CCG}$ eventually is very close to $V_{CC}$ and not $2*V_{CC}$. In some embodiments, the voltage level of the CPOUT is still $2*V_{CC}$. In some embodiments, the remaining voltage difference between CPOUT and $V_{CCG}$ is applied across transistor $MP_{SW}$. In this example, the maximum voltage across transistor $MP_{SW}$ is $V_{CC}$ and this may not cause a reliability problem for transistor $MP_{SW}$.

In some embodiments, though the final voltage level of the gated rail ($V_{CCG}$) is close to $V_{CC}$, there is a possibility of the final voltage exceeding the $V_{CC}$ level a little bit which may cause a reverse current from the $V_{CCG}$ node to the $V_{CC}$ node. To address this issue, in some embodiments, a $V_{CCG}$ level detector circuit (not shown) is added to monitor the level of $V_{CCG}$. In some embodiments, the $V_{CCG}$ level detector may operate during a wake-up event and may check the level of $V_{CCG}$ to determine whether the $V_{CCG}$ level will exceed a predetermined target threshold (e.g., 95%) of $V_{CC}$. In some embodiments, once $V_{CCG}$ exceeds the predetermined target threshold, the output of the $V_{CCG}$ level detector is inverted which stops the CP operation. As such, the flow of reverse current is prevented in accordance with some embodiments.

Figure 5:
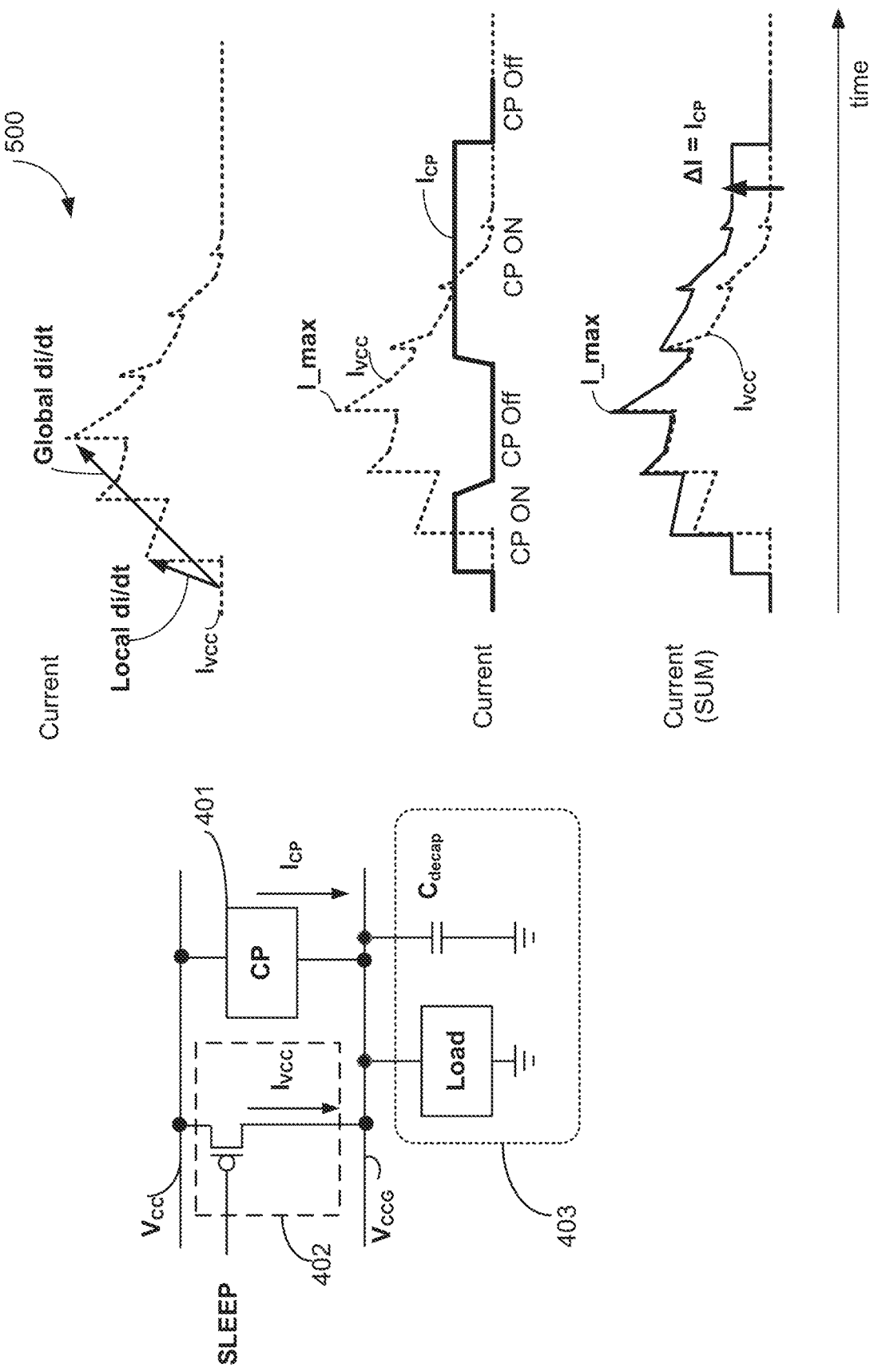
FIG. 5 illustrates current plots of the charge-pump assisted wake-up network, according to some embodiments of the disclosure.

In some embodiments, Logic 404 counts a number of clock cycles and after a predetermined number of clock cycles, it turns off CP 401. In some embodiments, Logic 404 knows when first and/or second droops occur on $V_{CC}$. In some embodiments, Logic 404 knows when local current peak occurs on the $V_{CC}$ node. For example, Logic 404 is aware of when the maximum current peal (I_max) can happen over PVT change. As such, Logic 404 is able to avoid an increased I_max value with CP 404, in accordance with some embodiments. In some embodiments, if the I_max event is realized between second, third local current peaks (as shown in FIG. 5), then Logic 404 is to generate a pulse at that moment to turn off CP 401. Referring back to FIG. 4, in some embodiments, if the I_max event is realized at different moment in a different environment, Logic 404 may adjust the timing of pulse to turn off CP 401 properly.

In some embodiments, the pulse is generated by a clock counting scheme implemented in Logic 404. In some embodiments, Logic 404 (or any other logic) may monitor the current level from CP 401 to generate a pulse to turn off CP 401.

In some embodiments, Logic 404 uses the information about when the maximum current peal (I_max) can happen over PVT change and turns off CP 401 during first and/or second voltage droop to reduce the possibility of current increase. In some embodiments, Logic 404 is operable to turn on CP 401 when PG 402 is just turned on. Logic 404 then turns off CP 401 during voltage droop duration and then turns on CP after the peak of the droop passes. In some embodiments, Logic 404 then turns off CP 401 after $V_{CCG}$ reaches its target level. In some embodiments, Logic 404 is a simple finite state machine (FSM).

In some embodiments, upon the sleep exit mode, the current through PG 402 will charge up the Load and $C_{decap}$ (as shown in block 403) simultaneously. In some embodiments, CP 401 speeds up the charging process since CP 401 can provide additional charge to the $V_{CCG}$ rail. In some embodiments, CP 401 can provide constant current regardless of the potential level of $V_{CCG}$ when CP 401 is based on a voltage-doubler concept, and as such CP 401 does not add additional di/dt on $V_{CC}$ rail.

FIG. 5 illustrates current plots 500 of charge-pump assisted wake-up network 400, according to some embodiments of the disclosure. It is pointed out that those elements of FIG. 5 having the same reference numbers (or names) as the elements of any other figure can operate or function in any manner similar to that described, but are not limited to such. Here, three sets of plots are shown.

The plot set on the top illustrates the current profile of $I_{VCC}$ (which is the current generated by PG 402) when there is no CP. Here, global and local di/dt are illustrated. For example, the current profile of $I_{VCC}$ of the top plot is the di/dt profile of wake-up network 300 (e.g., Flops and Daisy chain). The evenly spaced clock delay will turn on the series of flops if PPG 301 in sequential order and this causes the periodic current peak. With this current plot, three parameters are defined—global di/dt and local di/dt and maximum current (I_max). Here the global di/dt concerns the current change over a wider time scale whereas the local di/dt checks the sudden current changes during the relatively short time period, and I_max is the current peak.

The plot set in the middle illustrates the same current profile of $I_{VCC}$ and current $I_{CP}$ from CP 401. There is no di/dt component in the CP current $I_{CP}$ because the current from CP 401 is substantially or completely constant. As described with reference to FIG. 4, in some embodiments, Logic 404 is operable to: turn on CP 401 when PG 402 is just turned on, then turn off CP 401 during the duration of local current peak on $V_{CC}$, then turn on CP 401 after the current peak (I_max) passes, and then turn off CP 401 after $V_{CCG}$ reaches its target level. Referring back to FIG. 5, the plot set at the bottom illustrates the same current profile of $I_{VCC}$ but superimposed with current $I_{CP}$ from CP 401. Various embodiments, maintains or lowers this di/dt using CP 401.

In some embodiments, by shutting off CP 401 partially or completely during the power-up duration, increase in I_max can be avoided. As such, the global di/dt and I_max may stay the same compared to the top plot set which uses a two-stage wake-up network of FIG. 3A. Referring back to FIG. 4, in some embodiments, the constant current from CP 401 may contribute to charge the $V_{CCG}$ node faster than the baseline case. In some embodiments, the local current peak may be reduced as CP 401 transfers more charge to the $V_{CCG}$ rail. As such, the apparatus of FIG. 4 improves local di/dt, reduces wake-up time, while maintaining same global di/dt and I_max compared to the baseline design of FIG. 3A.

In some embodiments, CP 401 may be replaced with a controllable constant current source. In the case, when the current source is a simple current source based on a current mirror circuit, the source transistor of the current source which provides a constant current to the $V_{CCG}$ will experience reduced $V_{DS}$ voltage as the $V_{CCG}$ level raises. This source transistor will soon enter in the linear region mode and this may affect the current driving ability of the current source and eventually reducing the current flow to the $V_{CCG}$ node. In some embodiments, a voltage doubler based CP 401 always dumps the same quantum of charge from the higher voltage level to the load ($V_{CCG}$ rail in this case). As such, with a voltage doubler based CP 401, there is no current reduction throughout the entire wake-up event. In some embodiments, the voltage doubler based CP 401 can be especially useful towards the end of the wake-up when PG 402 has little current driving capability due to the linear region operation. While the various embodiments describe a voltage doubler based CP model, CP with multi-phase operation can also be used. Other types of charge-pumps such as switched-capacitor based charge-pump can also be used as CP 401.

FIG. 6 illustrates charge-pump circuit 600 (e.g., circuit 401a) for use in the charge-pump assisted wake-up network, according to some embodiments of the disclosure. It is pointed out that those elements of FIG. 6 having the same reference numbers (or names) as the elements of any other figure can operate or function in any manner similar to that described, but are not limited to such.

In some embodiments, charge-pump circuit 600 comprises n-type transistors MN1 and MN2; p-type transistors MP1 and MP2, inverters inv1 and inv2, and flying capacitors C1 and C2. In some embodiments, n-type transistors MN1 and MN2 double the input voltage $V_{CC}$ using clock signal CLK and flying capacitors at both sides (e.g., on nodes n1 and n2). In some embodiments, p-type transistors MP1 and MP2 at the bottom act as switches and transfer the charge at $2*V_{CC}$ level to the load (in this case $V_{CCG}$). As such, the current waveform from CP circuit 600 is synchronized with the clock signal CLK. In some embodiments, whenever there are clock rising and falling edges, CP circuit 600 may dump the charge to the load and this makes current peaks in I_CP. This periodicity of the current peaks is determined by the frequency of the clock signal CLK, in accordance with some embodiments.

Figure 7A:
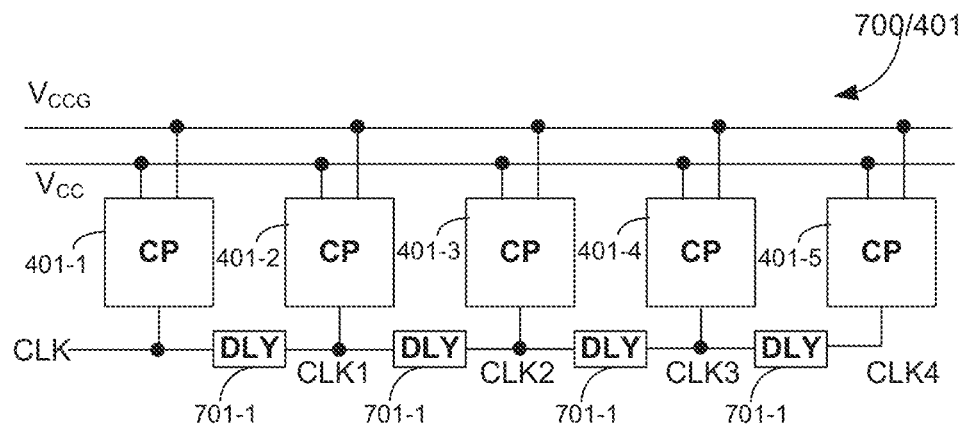
FIG. 7A illustrates a multi-phase charge-pump circuit for use in the charge-pump assisted wake-up network, according to some embodiments of the disclosure.
Figure 7B:
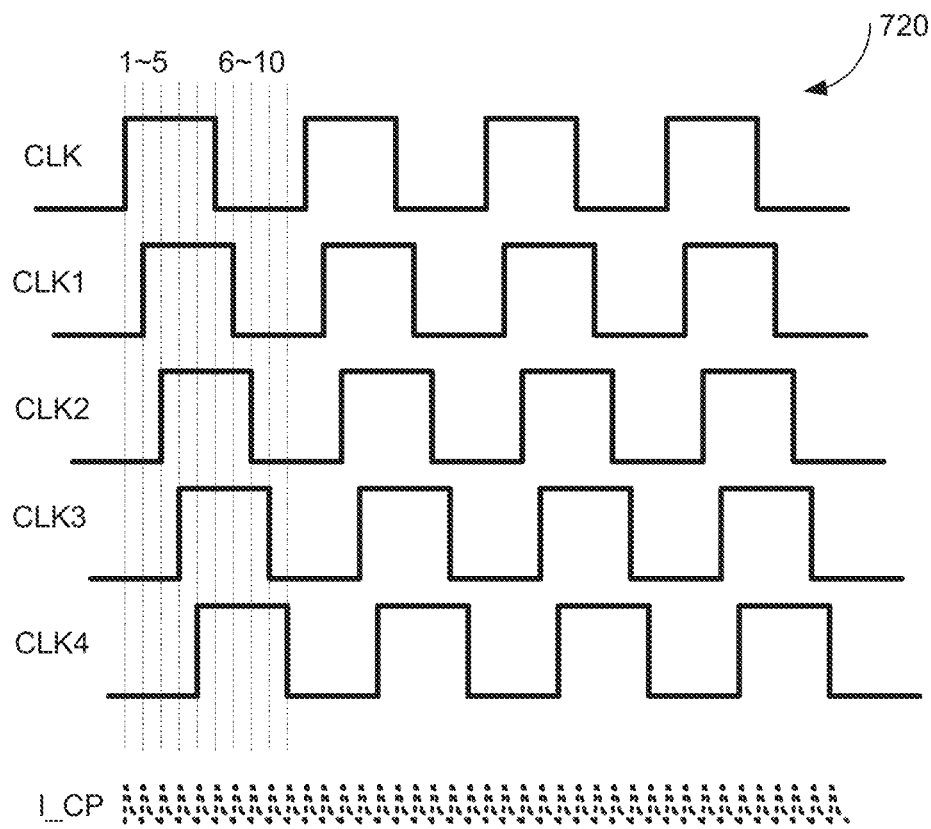
FIG. 7B illustrates the timing diagram of the clock signals of the multi-phase charge-pump circuit of FIG. 7A, in accordance with some embodiments of the disclosure.

FIG. 7A illustrates multi-phase charge-pump circuit 700 (e.g., circuit 401a) for use in the charge-pump assisted wake-up network, according to some embodiments of the disclosure. It is pointed out that those elements of FIG. 7 having the same reference numbers (or names) as the elements of any other figure can operate or function in any manner similar to that described, but are not limited to such.

In some embodiments, multi-phase charge-pump circuit 700 comprises a plurality of charge-pump circuits 401-1 to 401-5. While multi-phase charge-pump circuit 700 illustrates five charge-pump circuits, any number of charge-pump circuits can be coupled together to form multi-phase charge-pump circuit 700. In some embodiments, each charge-pump circuit is a voltage doubler like the one described with reference to FIG. 6. Referring back to FIG. 7, in other embodiments, other types of charge-pump circuits may be used.

In some embodiments, CLK to each CP after the first CP is delayed. For the multi-phase operation, clock signals driving each CP are distributed evenly using an additional delay unit (DLY). This makes the output current appear like a constant current. In this example, four delay circuits 701-1 through 701-4 are shown that provide clocks CLK1, CLK2, CLK3, and CLK4 for charge-pumps CP 401-2, 401-3, 401-4, and 401-5, respectively. These clock signals are shown in timing diagram 720 of FIG. 7B. In some embodiments, multiphase operation using multiple units of CP in series is used for the near DC current from the CP.

Figure 8:
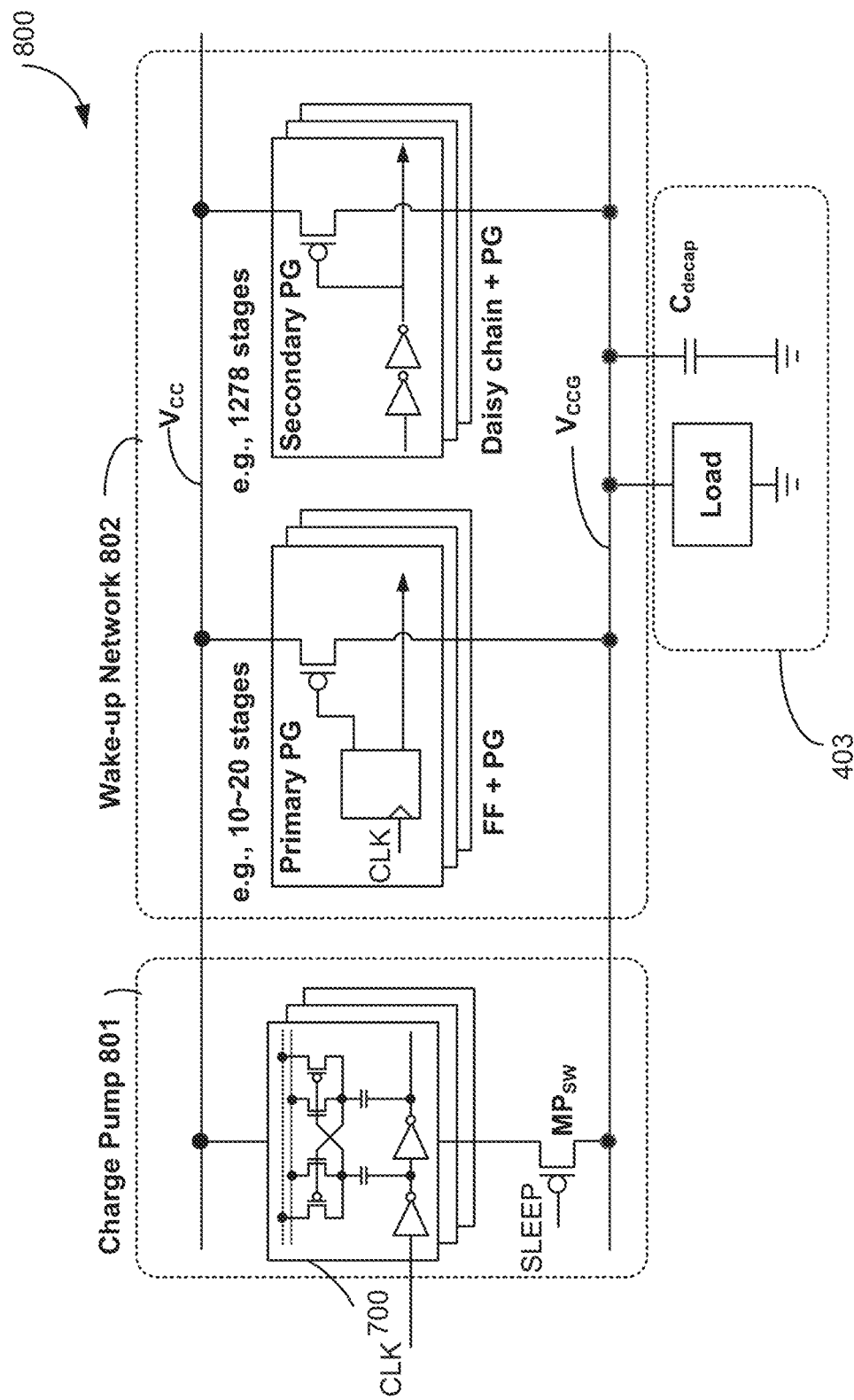
FIG. 8 illustrates a charge-pump assisted wake-up network with a two-stage power gate configuration, according to some embodiments of the disclosure.

FIG. 8 illustrates charge-pump assisted wake-up network 800 with a two-stage power gate configuration, according to some embodiments of the disclosure. It is pointed out that those elements of FIG. 8 having the same reference numbers (or names) as the elements of any other figure can operate or function in any manner similar to that described, but are not limited to such. Charge-pump assisted wake-up network 800 comprises charge-pump block 801 having a multi-phase charge-pump circuit 700 and p-type switch $MP_{SW}$, and Wake-up Network 802. In some embodiments, Wake-up Network 802 comprises a two stage power gate configuration as described with reference to FIGS. 3A-C.

Figure 9:
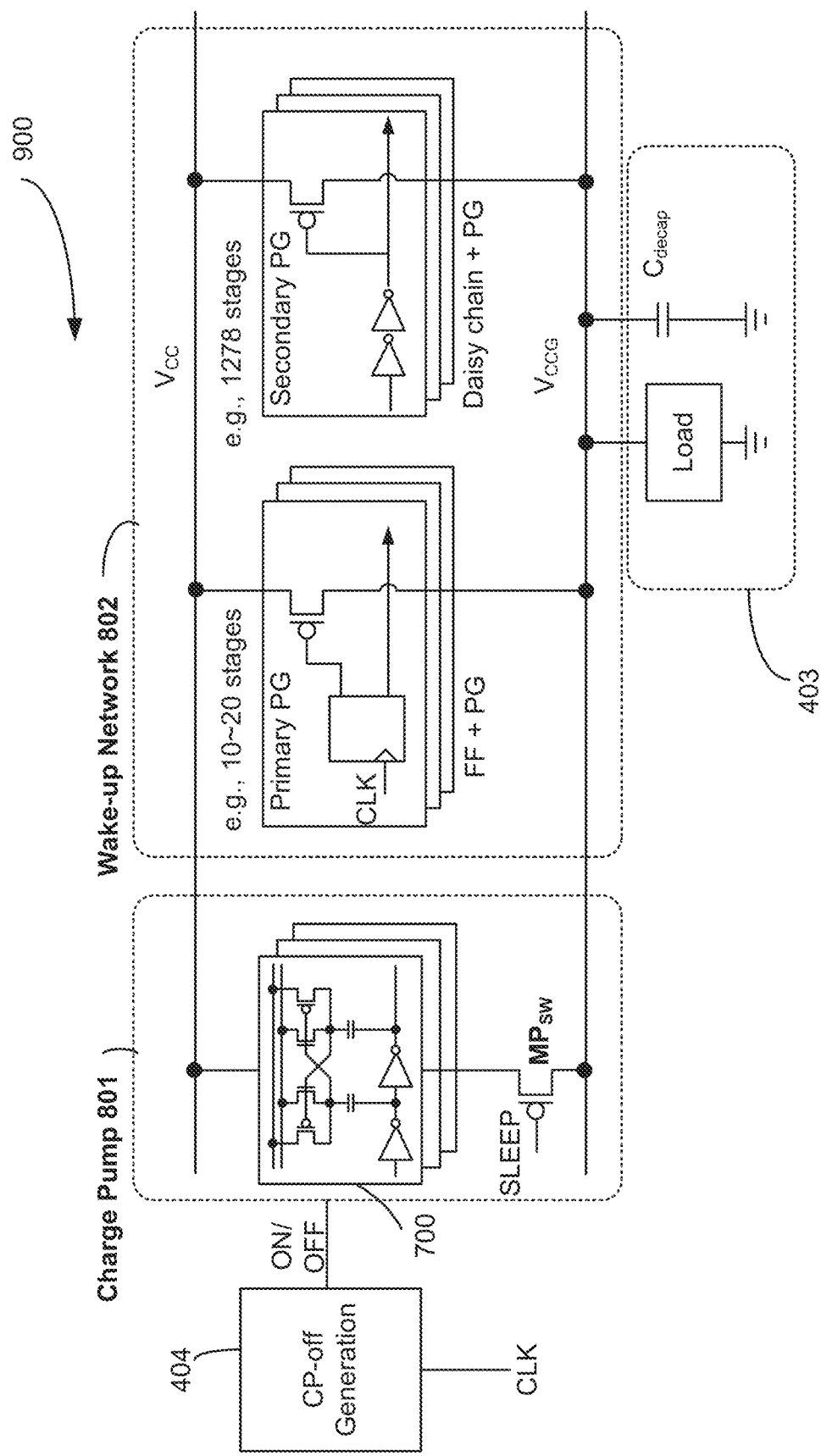
FIG. 9 illustrates a controllable charge-pump assisted wake-up network with the two-stage power gate configuration, according to some embodiments of the disclosure.

FIG. 9 illustrates controllable charge-pump assisted wake-up network 900 with a two-stage power gate configuration, according to some embodiments of the disclosure. It is pointed out that those elements of FIG. 9 having the same reference numbers (or names) as the elements of any other figure can operate or function in any manner similar to that described, but are not limited to such. Controllable charge-pump assisted wake-up network 900 comprises charge-pump block 801 having a multi-phase charge-pump circuit 700 and p-type switch $MP_{SW}$, and Wake-up Network 802. In some embodiments, Wake-up Network 802 comprises a two-stage power gate configuration as described with reference to FIGS. 3A-C, and Logic 404 for generating ON/OFF signals for CP 801.

In some embodiments, Logic 404 generates "Partial CP turn-off" control signal (same as ON/OFF signal) from the clock signal CLK. For example, Logic 404 triggers a latch (or a flip-flop) at a certain order and generates stepwise signals derived from the clock signal CLK. These edges are chosen to turn off CP 401 when the original I_max reaches the maximum value, in accordance with some embodiments. By combining multiple step signals together, a turn-off pulse is generated. This turn-off pulse can be used to turn off some portion of the CP 401 (or the whole CP) during a certain designated time period. Eventually, the sum of the $I_{CP}$ and I_max currents will have a different peak value which will be slightly higher (e.g., when CP 401 is partially off) or same (e.g., when the whole CP 401 is off) that with a baseline case. Here, the "ON/OFF" signal from Logic 404 is the pulse which controls the on/off operation of the partial (or whole) CP and makes the maximum peak current value to be the same as that of the baseline design while improving wake-up time (e.g., making the wake-up time shorter).

Figure 10A:
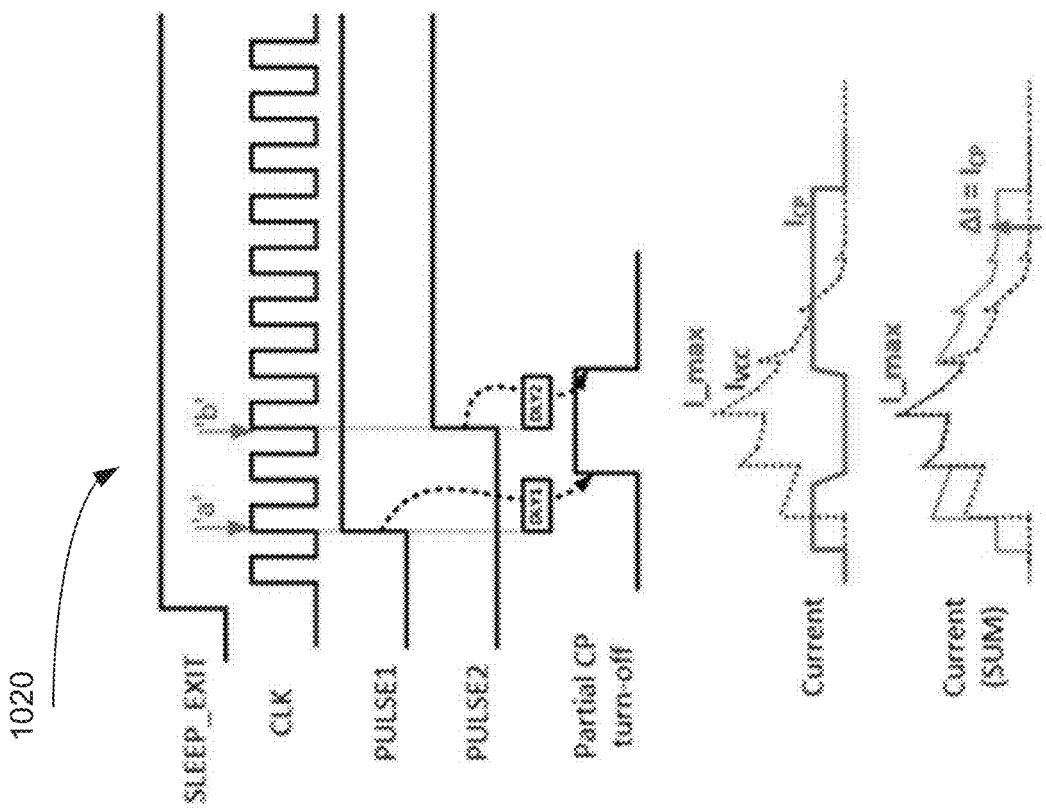
FIG. 10A illustrates a timing diagram and current waveforms associated with the apparatus of FIG. 8, in accordance with some embodiments of the disclosure.
Figure 10B:
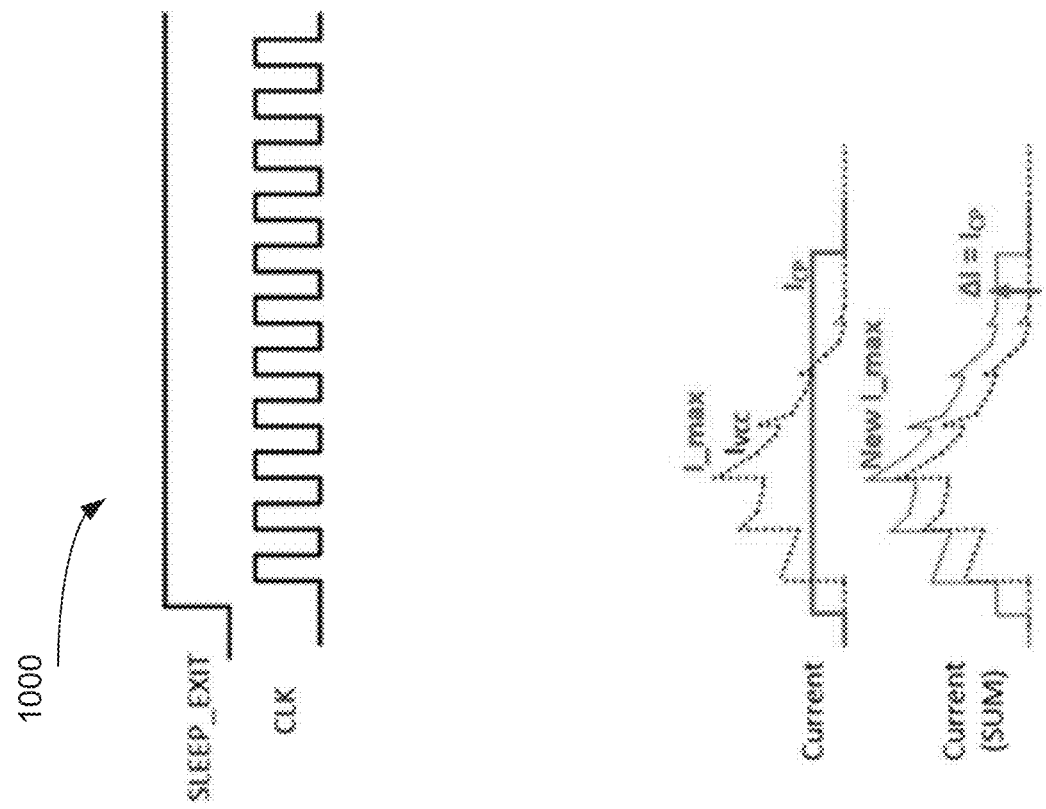
FIG. 10B illustrates a timing diagram and current waveforms associated with the apparatus of FIG. 9, in accordance with some embodiments of the disclosure.

FIG. 10A illustrates timing diagram 1000 and current waveforms associated with the apparatus of FIG. 8, in accordance with some embodiments of the disclosure. FIG. 10B illustrates timing diagram 1020 and current waveforms associated with the apparatus of FIG. 9, in accordance with some embodiments of the disclosure. As explained here, adding CP 401 enhances the wake-up time during the sleep exit mode. A charge-pump that adds constant current during the wake-up time (e.g., when PG 402 begins to charge $V_{CCG}$ and completes the charging process) can cause a high I_max value. This phenomenon is shown by timing diagram 1000. Here, the New I_max graph has higher peak current than the case of FIG. 3A-C without a CP. To resolve this high I_max issue, partial (or whole) CP off technique of FIG. 9 is used which produces timing diagram 1020, in accordance with some embodiments.

In some embodiments, Logic 404 receives CLK signal and generates PULSE1 and PULSE2 signals by latching clocks at two edges (e.g., edge 'a' and edge 'b'). In some embodiments, Logic 404 uses these PULSE1 and PULSE2 signals to generate the ON/OFF signal or the "Partial CP turn-off" pulse. This pulse turns off CP 401 completely or partially during the time when a voltage droop on $V_{CC}$ is expected. For example, when a larger voltage droop on the $V_{CC}$ node than without CP is expected, then the pulse turns off CP 401 completely or partially. As such, the sum of the $I_{CP}$ and I_max currents will have a different peak value which will be the same/lower level with the baseline case. For example, when the pulse turns off CP 401 completely or partially, the maximum peak current value is made to be the same as that of the baseline design while improving wake-up time (e.g., making the wake-up time shorter).

Figure 11:
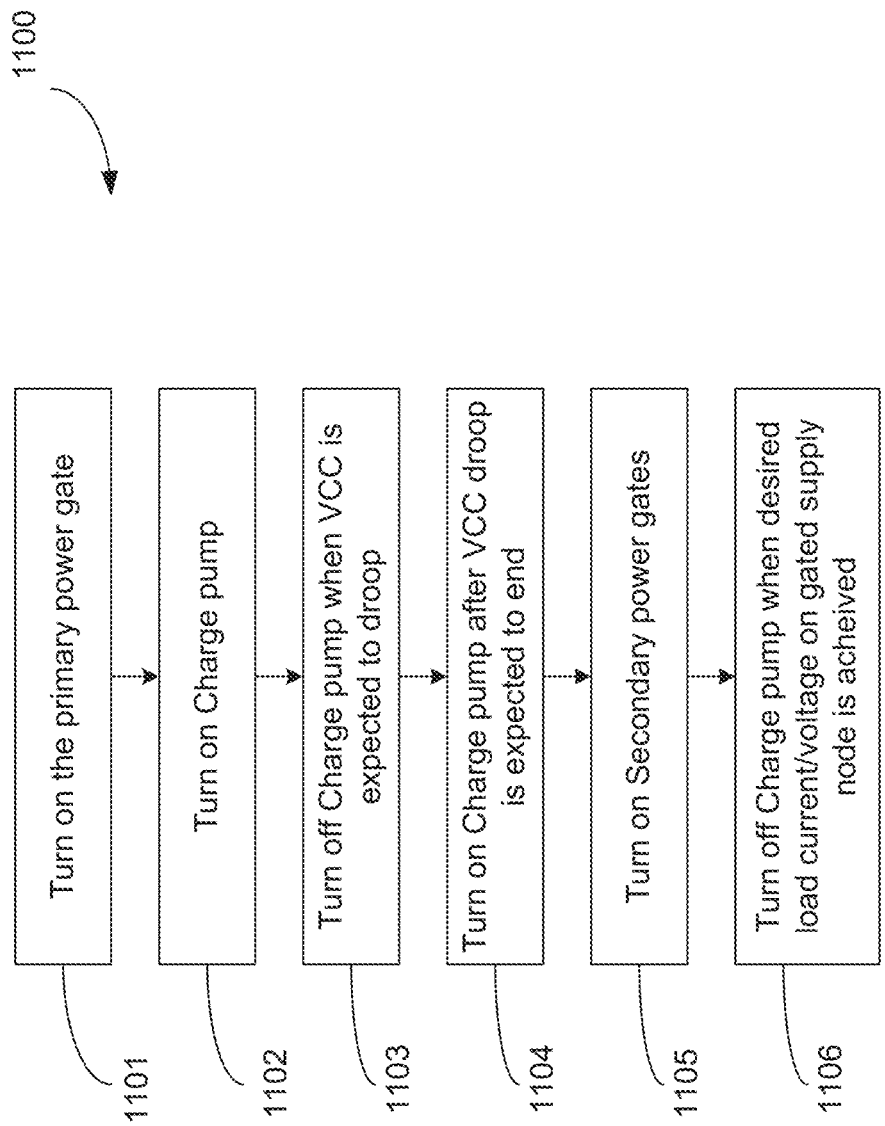
FIG. 11 illustrates a flowchart of a method for operating the apparatus of FIG. 9, in accordance with some embodiments of the disclosure.

FIG. 11 illustrates flowchart 1100 of a method for operating apparatus of FIG. 9, in accordance with some embodiments of the disclosure. It is pointed out that those elements of FIG. 11 having the same reference numbers (or names) as the elements of any other figure can operate or function in any manner similar to that described, but are not limited to such. Although the blocks in the flowchart with reference to FIG. 11 are shown in a particular order, the order of the actions can be modified. Thus, the illustrated embodiments can be performed in a different order, and some actions/blocks may be performed in parallel. Some of the blocks and/or operations listed in FIG. 11 are optional in accordance with certain embodiments. The numbering of the blocks presented is for the sake of clarity and is not intended to prescribe an order of operations in which the various blocks must occur.

At block 1101, PPG 301 is turned on upon exit from a sleep mode. At block 1102, CP 401 is turned on by Logic 404. CP 401 then begins to provide constant charge to $V_{CCG}$, in accordance with some embodiments. At block 1103, CP 401 is turned off by ON/OFF pulse generated by Logic 404. At block 1104, CP 401 is turned back on when the ON/OFF pulse ends. In some embodiments, the timing and duration of the pulse are controlled by the location in time of the current peak (I_max) on $V_{CC}$. At block 1105, SPG 302 is turned on in a daisy chain fashion. During the time SPG 302 is turned on, CP 401 is kept on. At 1106, CP 401 is turned off when the desired load current/voltage on the $V_{CCG}$ node is achieved.

Figure 12:
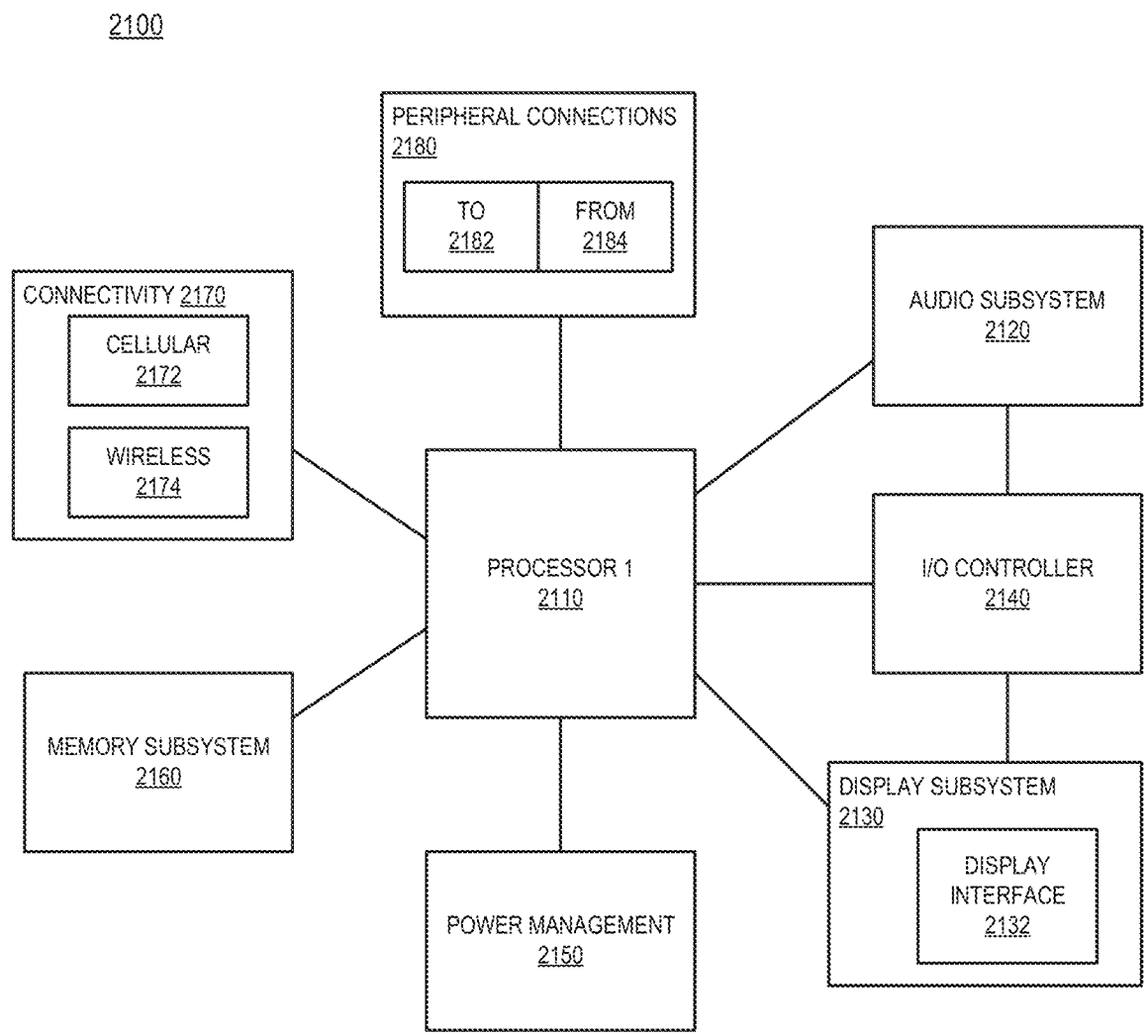
FIG. 12 illustrates a smart device or a computer system or a SoC (System-on-Chip) having charge-pump assisted wake-up network, in accordance with some embodiments.

FIG. 12 illustrates a smart device or a computer system or a SoC (System-on-Chip) 2100 having charge-pump assisted wake-up network, in accordance with some embodiments. It is pointed out that those elements of FIG. 12 having the same reference numbers (or names) as the elements of any other figure can operate or function in any manner similar to that described, but are not limited to such.

FIG. 12 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes processor 2110 having charge-pump assisted wake-up network, according to some embodiments discussed. Other blocks of the computing device 2100 may also include charge-pump assisted wake-up network of some embodiments. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a controllable power gate coupled to an ungated power supply node and a gated power supply node; and a charge-pump circuit operable to be turned on and off according to a logic, wherein the charge pump circuit is coupled in parallel to the controllable power gate and also coupled to the ungated power supply node and the gated power supply node. In some embodiments, the charge-pump circuit is operable to turn on such that the gated power supply node is charged faster than when the charge-pump circuit is off. In some embodiments, the charge-pump circuit is operable to provide a constant current to the gated power supply node.

In some embodiments, the charge-pump circuit is operable to turn off for at least two clock cycles. In some embodiments, the logic is to count edges of a clock and to generate a pulse to turn off the charge-pump circuit. In some embodiments, the charge-pump circuit comprises a multi-phase charge pump. In some embodiments, the controllable power gate comprises a primary power gate and a secondary power gate, wherein the primary power gate is larger than the secondary power gate. In some embodiments, the primary power gate comprises two or more transistors which are operable to turn on sequentially. In some embodiments, the secondary power gate comprises two or more transistors which are to turn on after at least one transistor of the primary power gate is turned on. In some embodiments, the transistors of the secondary power gate are configured in a daisy chain.

In another example, a system is provided which comprises: a memory, a processor coupled to the memory, wherein the processor includes an apparatus according to the apparatus described above; and a wireless interface for allowing the processor to communicate with another device.

In another example, an apparatus is provided which comprises: an ungated power supply node; a gated power supply node; a primary power gate coupled to the ungated power supply node and the gated power supply node; a secondary power gate coupled to the ungated power supply node and the gated power supply node, the secondary power gate being smaller in size than the primary power gate; logic to generate a pulse; and a charge-pump circuit operable to be turned on and off according to the pulse, wherein the charge pump circuit is coupled in parallel to the controllable power gate and also coupled to the ungated power supply node and the gated power supply node. In some embodiments, the charge-pump circuit is operable to provide a constant current to the gated power supply node. In some embodiments, the logic is to generate a first edge of the pulse after at least one clock cycle. In some embodiments, the charge pump circuit is to be turned off after the primary power gate is turned on. In some embodiments, the charge pump circuit is a multi-phase charge-pump circuit.

In another example, a system is provided which comprises: a memory, a processor coupled to the memory, wherein the processor includes an apparatus according to the apparatus described above; and a wireless interface for allowing the processor to communicate with another device.

In another example, a method is provided which comprises: turning on a power gate, the power gate coupled to ungated power supply node and a gated power supply node; turning off a charge-pump circuit during a current spike duration; and turning on the charge-pump when the current spike duration is over, wherein the charge pump circuit is coupled in parallel to the controllable power gate and also coupled to the ungated power supply node and the gated power supply node. In some embodiments, turning on the charge-pump comprises charging the gated power supply node faster than when the charge-pump circuit is off. In some embodiments, the method comprises providing a constant current to the gated power supply node. In some embodiments, the method turning off the charge pump for at least two clock cycles before the current spike duration starts. In some embodiments, the method comprises: counting edges of a clock: and generating a pulse to turn off the charge-pump circuit.

In another example, an apparatus is provided which comprises: means for turning on a power gate, the power gate coupled to ungated power supply node and a gated power supply node; means for turning off a charge-pump circuit during a current spike duration; and means for turning on the charge-pump when the current spike duration is over, wherein the charge pump circuit is coupled in parallel to the controllable power gate and also coupled to the ungated power supply node and the gated power supply node. In some embodiments, the apparatus comprises means for providing a constant current to the gated power supply node. In some embodiments, the apparatus comprises means for turning off the charge pump for at least two clock cycles before the current spike duration starts. In some embodiments, the apparatus comprises: means for counting edges of a clock: and means for generating a pulse to turn off the charge-pump circuit.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a controllable power gate coupled to an ungated power supply node and a gated power supply node;
a charge-pump circuit operable to be turned on and off according to a logic, wherein the charge-pump circuit is coupled in parallel to the controllable power gate and also coupled to the ungated power supply node and the gated power supply node, wherein the charge-pump circuit has substantially constant charge transfer efficiency; and
a transistor controllable by a low power mode signal, wherein the transistor is coupled in series with the charge-pump circuit such that the transistor and the charge-pump circuit together are coupled in parallel to the controllable power gate.

2. The apparatus of claim 1, wherein the charge-pump circuit is operable to turn on such that the gated power supply node is charged faster than when the charge-pump circuit is off.

3. The apparatus of claim 1, wherein the charge-pump circuit is operable to provide a constant current to the gated power supply node.

4. The apparatus of claim 1, wherein the charge-pump circuit is operable to turn off for at least two clock cycles.

5. The apparatus of claim 1, wherein the logic is to count edges of a clock and to generate a pulse to turn off the charge-pump circuit.

6. The apparatus of claim 1, wherein the charge-pump circuit comprises a multi-phase charge-pump.

7. The apparatus of claim 1, wherein the controllable power gate comprises a primary power gate and a secondary power gate, wherein the primary power gate is larger than the secondary power gate.

8. The apparatus of claim 7, wherein the primary power gate comprises two or more transistors which are operable to turn on sequentially.

9. The apparatus of claim 8, wherein the secondary power gate comprises two or more transistors which are to turn on after at least one transistor of the primary power gate is turned on.

10. The apparatus of claim 9, wherein the two or more transistors of the secondary power gate are configured in a daisy chain.

11. An apparatus comprising:
an ungated power supply node;
a gated power supply node;
a primary power gate coupled to the ungated power supply node and the gated power supply node;
a secondary power gate coupled to the ungated power supply node and the gated power supply node, the secondary power gate being smaller in size than the primary power gate, wherein the primary power gate and the secondary power gate have a same conductivity type;
logic to generate a pulse; and
a charge-pump circuit operable to be turned on and off according to the pulse, wherein the charge-pump circuit is coupled in parallel to a controllable power gate and also coupled to the ungated power supply node and the gated power supply node, and wherein the charge-pump circuit has substantially constant charge transfer efficiency.

12. The apparatus of claim 11, wherein the charge-pump circuit is operable to provide a constant current to the gated power supply node.

13. The apparatus of claim 11, wherein the logic is to generate a first edge of the pulse after at least one clock cycle.

14. The apparatus of claim 11, wherein the charge-pump circuit is to be turned off after the primary power gate is turned on.

15. The apparatus of claim 11, wherein the charge-pump circuit is a multi-phase charge-pump circuit.

16. A system comprising:
a memory;
a processor coupled to the memory, the processor including:
a controllable power gate coupled to an ungated power supply node and a gated power supply node;
a charge-pump circuit operable to be turned on and off according to a logic, wherein the charge pump circuit is coupled in parallel to the controllable power gate and also coupled to the ungated power supply node and the gated power supply node, wherein the charge-pump circuit has substantially constant charge transfer efficiency; and
a transistor controllable by a low power mode signal, wherein the transistor is coupled in series with the charge-pump circuit such that the transistor and the charge-pump circuit together are coupled in parallel to the controllable power gate; and
a wireless interface to allow the processor to communicate with another device.

17. The system of claim 16, wherein the charge-pump circuit is operable to turn on such that the gated power supply node is charged faster than when the charge-pump circuit is off.

18. The system of claim 16, wherein the charge-pump circuit is operable to provide a constant current to the gated power supply node.

19. The system of claim 16, wherein the charge-pump circuit is operable to turn off for at least two clock cycles.

20. The system of claim 16, wherein the logic is to count edges of a clock and to generate a pulse to turn off the charge-pump circuit.

21. An apparatus comprising:
- a controllable power gate coupled to an ungated power supply node and a gated power supply node;
- a charge-pump coupled to the controllable power gate;
- a logic to turn on the charge pump when the controllable power gate is just turned on, and to turn off the charge pump during a voltage droop on the gated power supply node; and
- a transistor controllable by a low power mode signal, wherein the transistor is coupled in series with the charge-pump such that the transistor and the charge-pump together are coupled in parallel to the controllable power gate.

22. The apparatus of claim 21, wherein the logic is to turn on the charge-pump after a current peak on the ungated power supply node passes.

23. The apparatus of claim 21, wherein the logic is to turn on the charge-pump after a peak of the voltage droop passes.

24. The apparatus of claim 21, wherein the logic comprises a finite state machine.

25. The apparatus of claim 21, wherein the logic is to monitor a current level from the charge-pump to generate a pulse to turn off the charge-pump.

26. The apparatus of claim 21, wherein an effective resistance of the charge-pump and the transistor is greater than an effective resistance of the controllable power gate.

\* \* \* \* \*